(No Model.)

F. K. & S. K. HERR.
VEHICLE BODY.

No. 274,769. Patented Mar. 27, 1883.

WITNESSES:
W. W. Hollingsworth
A. G. Syne

INVENTOR:
F. K. Herr
S. K. Herr
BY Munn
ATTORNEYS.

UNITED STATES PATENT OFFICE.

FRANK K. HERR AND SAMUEL K. HERR, OF WESTMINSTER, MARYLAND.

VEHICLE-BODY.

SPECIFICATION forming part of Letters Patent No. 274,769, dated March 27, 1883.

Application filed January 9, 1883. (No model.)

*To all whom it may concern:*

Be it known that we, FRANK K. HERR and SAMUEL K. HERR, of Westminster, in the county of Carroll and State of Maryland, have invented a new and useful Improvement in Vehicles, of which the following is a full, clear, and exact description, reference being had to the annexed drawings, forming part of this specification.

The object of this invention is to provide a vehicle-body adapted to be supported upon elliptical springs, which shall be arranged thereunder in such manner as to allow the body to swing lower than the main part of the springs.

Figure 1:
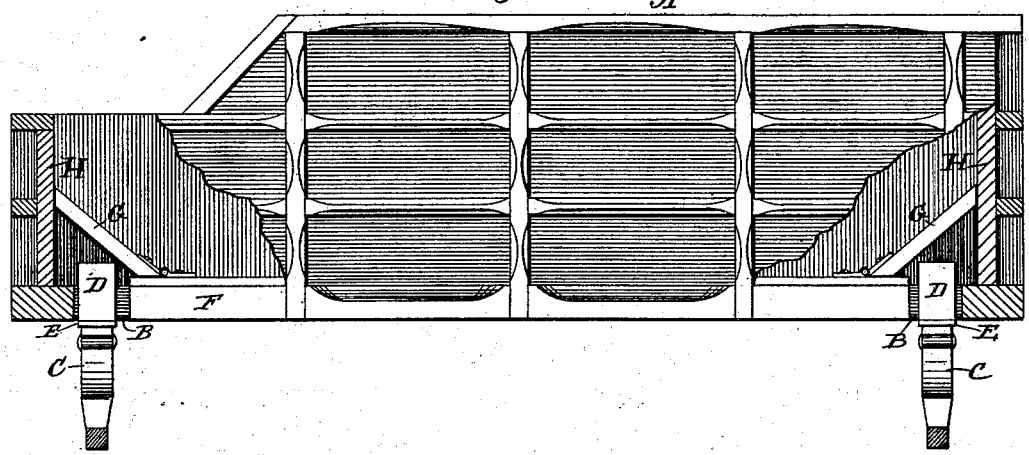
Figure 2:
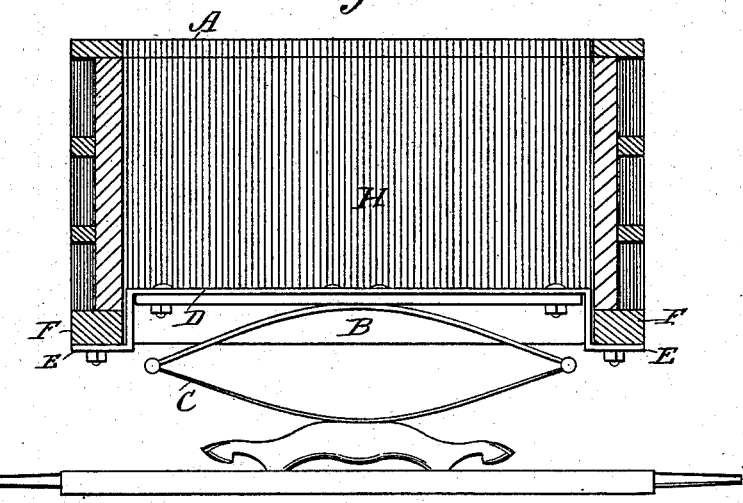

In the drawings, Figure 1 is a side elevation of the body, springs, and axles of a vehicle, the body being partly in section; and Fig. 2 is a transverse section on line $x\,x$, Fig. 1.

A indicates the vehicle-body, which is formed with transverse openings B at the ends, in which the elliptical springs C are arranged. The upper part of the spring C is secured to a cross-bar, D, which is provided with flanges or shoulders E, adapted to be bolted to the under side of the sills F of the body. When the springs are compressed they are accommodated in the openings B, while the body swings down to the base of the springs. The openings B are covered inside the body by flap-doors G, which rest against the end walls, H, of the body.

If desired, the doors G may be dispensed with, and closed chambers be provided for the springs instead.

What we claim as new, and desire to secure by Letters Patent, is—

1. A vehicle-body having openings extending across its ends, combined with cross-bars secured longitudinally in and above the openings, and elliptical springs secured to the cross-bars, substantially as shown and described.

2. A vehicle-body having transverse openings formed in its extreme ends and inclined doors supported against its ends for covering said openings, combined with cross-bars secured longitudinally in and above the openings, and elliptical springs secured to the center of the cross-bars, substantially as shown and described.

FRANK K. HERR.
SAMUEL K. HERR.

Witnesses:
CHAS. BILLINGSLEA,
HUGO E. FIDDIS.